Patented Dec. 22, 1931                                                  1,837,878

UNITED STATES PATENT OFFICE

JAMES F. McDOWALL, OF AKRON, OHIO, ASSIGNOR TO THE B. F. GOODRICH COMPANY, OF NEW YORK, N. Y., A CORPORATION OF NEW YORK

CORE PUTTY

No Drawing.        Application filed May 31, 1930. Serial No. 458,925.

The invention relates to the art of casting metals and particularly to the art of preparing the molds in which metals are cast.

While the portion of the mold which defines the exterior surface of the article or casting is ordinarily made from damp or green sand, and is consequently readily patched if some minor defect occurs therein, the cores which define the cavities of hollow castings are ordinarily made of sand mixed with considerable proportions of a binder and baked or otherwise hardened. Minor defects in such cores are not readily repaired, particularly if they occur during or after the baking, for the patch not only does not adhere satisfactorily, but does not acquire the same degree of strength as the baked core. Where the core has a shape other than a very simple one, and is built up of sections the sections frequently do not form a perfect union but leave cracks or irregularities in the finished casting.

The chief object of this invention, therefore, is to provide a putty-like composition which may be employed for patching cores, filling cracks, and making other minor repairs.

The composition of this invention comprises a mixture of a solution of a heat-plastic rubber isomer in a volatile organic solvent with a sufficient quantity of an inert pigment to impart a putty-like consistency to the composition. The composition, because of its smooth, putty-like consistency is readily applied to the cores with a trowel or spatula, or even with the fingers. The rubber isomer employed as a binder is a powerful adhesive, insuring the permanent adhesion of the patch to the body of the core, and also insuring the development of a maximum degree of strength in the patch itself upon drying. The patch hardens upon air-drying by reason of the evaporation of the volatile solvent employed, no baking or other treatment being required. The shrinkage on drying is practically negligible, the pigment particles already being in contact, the reduction in volume on evaporation of the solvent resulting chiefly in the formation of a porous structure, which is in itself advantageous in that it permits escape of gases from the core during the casting operation. The composition is readily brought to a workable consistency by the addition of a small portion of solvent if it dries out before being used. Frequently it is sufficient to moisten the trowel or other tool with which the putty may be applied with the solvent.

The binder employed in the preparation of the core putty is preferably a tough heat-plastic balata-like rubber-isomer, such as that prepared by the reaction of rubber with sulphonic acids, and described by Harry L. Fisher in the United States Patent No. 1,605,180, granted November 2, 1926. These rubber isomers have properties varying from those of vulcanized rubber, to those of hard balata, or even of shellac. They are soluble in the ordinary rubber solvents such as benzene, toluene, tetraline, gasoline, carbon tetrachloride, chloroform, etc. When purified, they contain only carbon and hydrogen in the same ratio as the rubber from which they were prepared, but are chemically less unsaturated than rubber. They may be prepared by various different methods, of which that disclosed in the above-mentioned patent is an illustration, hence the term "tough, heat-plastic rubber isomers" will hereinafter be employed to include substances which contain carbon and hydrogen in the same ratio as rubber, but which are chemically less unsaturated than rubber, regardless of the particular method by which they are prepared.

In one embodiment of this invention, 1 part by weight of the above-mentioned tough, heat-plastic rubber isomer is dissolved in 5 parts of gasoline. This solution is mixed in a suitable mixer with 17 parts by weight of finely ground quartz, and then brought to the proper putty-like consistency by adding enough gasoline to replace that lost by evaporation during the mixing, say an additional ¼ to ½ part of gasoline. It will be noted that the pigment occupies about 6½ times the volume of the binder employed.

In another embodiment, the solution mentioned above is mixed with 11½ parts of red foundry talc, and thinned with about 1 part of gasoline. The larger quantity of liquid required to make a putty with the talc, which has approximately the same density as quartz but is only employed to the extent of 4 to 4½ times the volume of the binder, is possibly due to the plate-like structure of the particles of the talc.

In another embodiment which is preferred for many purposes, the solution mentioned above is mixed with 19 parts of flake graphite and thinned with 6 parts of gasoline. Although the relative proportion of binder is less, the graphite occupying 8 times the volume of the binder, the lubricating properties of the graphite make this composition a particularly pleasant one to handle. The smaller proportion of binder suffices to give the dry composition the necessary strength because the particles are apparently somewhat larger than those of the other compositions described above, and the surface to be coated is not so great.

In general, it is contemplated that from 3 to 10 volumes of a suitable pigment be mixed with a solution of 1 volume of the tough, heat-plastic rubber isomer, the mixture being thinned to a putty-like consistency by the addition of a further quantity of solvent if necessary.

Obviously other inert pigments may be substituted for those specifically mentioned above, either in whole or in part, or a mixture of coarse and fine pigments may be employed, or other volatile solvents may be employed, or other variations may be made without departing from the spirit and scope of this invention. It is therefore not intended to limit the invention except as may be required by the prior art and as set forth in the appended claims.

I claim:

1. A core putty comprising a solution of a tough, heat-plastic rubber isomer stiffened to a plastic, putty-like consistency by the admixture of an inert pigment.

2. A core putty comprising a solution of a tough, heat-plastic rubber isomer, and an inert pigment in such a proportion as to occupy from 3 to 10 times the volume of the rubber isomer, the volume of liquid being such as to impart a plastic putty-like consistency to the composition.

3. A core putty comprising a solution of a tough, heat-plastic rubber isomer in a volatile solvent, and a flake pigment in such a proportion as to occupy from 3 to 10 times the volume of the rubber isomer, the volume of the liquid being such as to impart a plastic, putty-like consistency to the composition.

4. A core putty comprising a solution of a tough, heat-plastic rubber isomer in a volatile organic solvent stiffened to a plastic, putty-like consistency by the admixture therewith of graphite.

5. A core putty comprising a solution of one part by weight of a tough, heat-plastic rubber isomer in approximately twelve parts by weight of a volatile hydrocarbon solvent stiffened by the admixture therewith of approximately nineteen parts of graphite.

In witness whereof I have hereunto set my hand this 29th day of May, 1930.

JAMES F. McDOWALL.